(12) United States Patent
Kisacanin

(10) Patent No.: US 6,925,445 B1
(45) Date of Patent: Aug. 2, 2005

(54) WEB-BASED DESIGN OF SOFTWARE FOR KEEP-ALIVE BOARDS

(75) Inventor: Branislav Kisacanin, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 352 days.

(21) Appl. No.: 09/467,396

(22) Filed: Dec. 20, 1999

(51) Int. Cl.[7] .............................................. G06F 17/60
(52) U.S. Cl. .............................. 705/26; 705/26; 705/27; 345/581; 345/594
(58) Field of Search .......................... 705/26, 27; 707/1

(56) References Cited

U.S. PATENT DOCUMENTS 6,163,878 A  * 12/2000 Kohl .............................. 717/1

* cited by examiner

Primary Examiner—Wynn W. Coggins
Assistant Examiner—J. Zurita
(74) Attorney, Agent, or Firm—Jimmy Funk

(57) ABSTRACT

A customer compatible software is electronically provided to a customer based on a customer specification provided through a web interface. In one embodiment, the specification is checked for input errors and the customer is prompted to correct any detected errors, before proceeding. In another embodiment, a specification file is created by a common gateway interface (CGI) program based on the received customer specification. A customer compatible executable is then created by first selecting generic source code from a library (based on the specification file). Next, the generic source code is modified (based on the specification file). Then, the modified generic source code is compiled and linked to create an executable. Finally, the executable is converted to a customer compatible executable and provided with documentation to the customer via e-mail.

20 Claims, 3 Drawing Sheets

WEB-BASED DESIGN OF SOFTWARE FOR KEEP-ALIVE BOARDS

BACKGROUND OF THE INVENTION

The present invention is directed to a software design tool, and more specifically to a web-based software design tool for keep-alive boards.

Traditionally, the design of software for keep-alive boards has required that a software engineer frequently modify existing software to meet a customer's requirements. Customers have often had difficulty in conveying their requirements, for a particular piece of software, and as a result have received software that did not meet their requirements. As the versions of a particular piece of software grew, the versions typically became more difficult to track and maintain. This was because, historically, a software engineer responsible for the design of a particular piece of software also controlled the software and was responsible for providing updated copies of the software to customers worldwide.

When the software engineer was unavailable, a customer was required to wait until that software engineer was able to provide a customized version of the software to them. As a result, customers have frequently waited for lengthy periods before receiving a customized version of a particular piece of software. In addition, creation of customized software has been expensive for the software engineer's employer.

While various web sites have provided downloadable software, these web sites have not allowed a customer to provide a specification from which customized software is created. As such, a new technique for providing customized software to a customer is desirable.

SUMMARY OF THE INVENTION

The present invention is directed to a technique for electronically providing customized software to a customer. A customer specification is initially provided through a web interface. Customer compatible software is then automatically created based on the customer specification. The customer compatible software is then electronically provided to the customer. In one embodiment, the customer specification is checked for input errors and the customer is prompted to correct any detected errors, before proceeding. In another embodiment, a specification file is created by a common gateway interface (CGI) program.

In yet another embodiment of the present invention, a customer compatible executable is created by first selecting generic source code (based on the specification file) from a generic source code library. Next, the generic source code is modified (based on the specification file). Then, the modified generic source code is compiled and linked to create an executable. Finally, the executable is converted to a customer compatible executable. In another embodiment, the customer compatible software and documentation (the specification file) for the customer compatible software are electronically provided to the customer. This advantageously allows a supplier to recreate the customer compatible software from the documentation at a later date.

These and other features, advantages and objects of the present invention will be further understood and appreciated by those skilled in the art by reference to the following specification, claims, and appended drawings.

DETAILED DESCRIPTION OF PREFERRED EMBODIMENTS

Figure 1:
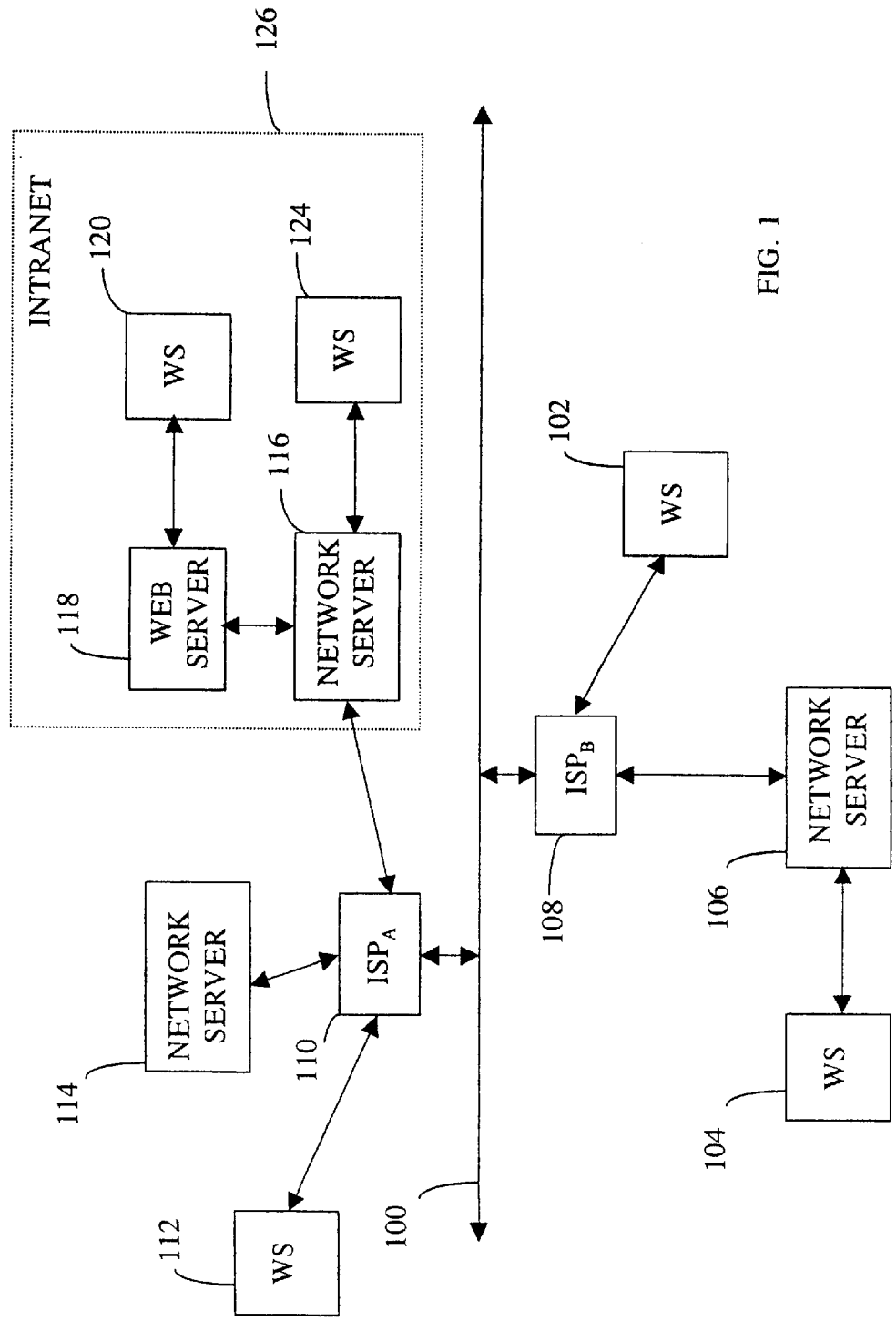
FIG. 1 is a block diagram of a web server/customer configuration, according to an embodiment of the present invention.

The present invention is broadly directed to a technique for electronically providing customized software to a customer. Initially, a customer provides a customer specification through a web interface. This web interface typically includes a form that the customer completes. Next, customer compatible software is created from the customer specification. Finally, the customer compatible software is electronically provided to the customer (e.g., by e-mail). In one embodiment, a JavaScript preprocessor checks the customer's specification for input errors and prompts the customer to correct any detected errors, before proceeding. In another embodiment, a specification file is created, based on the received customer specification, using a common gateway interface (CGI) program.

The CGI program can be written in virtually any programming language (e.g., C, Perl, Java or Visual Basic). A customer compatible executable, based upon the specification file, is then created. The customer compatible executable is created by selecting generic source code and modifying the generic source code based on the specification file. The modified generic source code is then compiled and linked to create an executable. If the executable is not in a customer compatible format, the executable is converted to a customer compatible executable. Preferably, documentation for the customer compatible software is also electronically provided to the customer. This is advantageous in that a supplier can recreate the customer compatible software, at a later date, from the documentation.

As is well known to one skilled in the art, a keep-alive is a piece of software used at production testing sites to keep a device under test (DUT) awake. The DUT can be, for example, a radio, an amplifier, a communication port or an OnStar® receiver. A keep-alive keeps a DUT awake by sending certain class 2 (C2) messages and thus imitating other devices which in normal usage would keep the DUT awake. In a preferred embodiment, the keep-alives are based on a Texas Instrument microprocessor (a TMS370) and an assembly software package for that processor. While the discussion herein is primarily focused on keep-alives, one of skill in the art will appreciate that the techniques described herein are applicable to any situation where a program selects and modifies source code provided in a library, based on a customer specification.

In a typical application, a web server, as described herein, can be used to maintain keep-alive software archives and/or create new keep-alive software. In a basic embodiment, keep-alive software implementing start-up messages (e.g., wake-up), periodic messages (e.g., state of health) and trigger/reply messages (e.g., power mode) can be created.

A typical web page, according to an embodiment of the invention, includes a form. The form allows a customer to enter, for example, a project name, a name of the individual requesting the keep-alive, the individual's e-mail address and the individual's telephone number. The form, as described herein, allows a customer to enter messages by inputting hexadecimal values in an entry box of the form. In the disclosed embodiment, bytes in a message are separated by spaces, while messages are separated by semi-colons. A trigger message is followed by an equal sign and by one or more reply messages that are separated by commas. One trigger/reply message is separated from another trigger/reply message by a semi-colon.

When a customer has submitted the requested information, a keep-alive process code selects generic source code from a generic source code library (based upon the customer selections). The keep-alive process code then causes the customer messages to be inserted into the pre-existing source code. As stated above, in one embodiment the web server utilizes a TMS370 compiler and linker that compiles and links the generic source code based upon the TMS370. The executable file created by the TMS370 compiler is in an OUT format (a Texas Instruments executable format).

As a general rule, the executable in the OUT format is converted to an executable in the PTP format (a Motorola executable format). The CGI program receives the customer compatible executable and provides the specification file (documentation) and the customer executable to the customer electronically via e-mail. In this manner, the web server can create, track and store newly created keep-alives. This reduces the need for a software engineer to perform this task. That is, providing the generic source code has been created in the library, the web server can receive a customer specification, create an executable for the customer specification and provide the executable and the documentation for the executable to a customer, without human intervention on the supplier's part.

FIG. 1 is a block diagram of a web server/customer configuration, according to an embodiment of the present invention. In this embodiment, a workstation 104 is coupled (e.g., through a network interface card (NIC) and an Ethernet) to a network server 106. Network server 106 is coupled to an Internet service provider (ISP$_B$) 108 via, for example, a T1 line. Also coupled to ISP$_B$ 108 is a workstation 102. ISP$_B$ 108 is coupled to a web server 118 via Internet 100, an ISP$_A$ 110 and a network server 116. Also coupled to ISP$_A$ 110 is a workstation 112 and a network server 114.

A workstation 124 is also coupled to network server 116. As shown, a workstation 120 is also coupled to web server 118. Workstation 120, workstation 124, network server 116 and web server 118 form an intranet 126. When a customer at workstation 104 wants to communicate with web server 118, this is accomplished through network server 106. Network server 106 communicates with ISP$_B$ 108. ISP$_B$ 108 communicates with ISP$_A$ 110 (via Internet 100). ISP$_A$ 110 communicates with network server 116, which in turn communicates with web server 118. In this configuration, all traffic between Internet 100 and intranet 126 is routed through ISP$_A$ 110.

In a similar manner, a customer at workstation 102 communicates with web server 118 through ISP$_B$ 108, ISP$_A$ 110 and network server 116. A customer, internal to intranet 126, can communicate with web server 118 through workstation 120 or workstation 124 (via network server 116). A customer at workstation 112 typically communicates with web server 118 via ISP$_A$ 110 and network server 116.

Figure 2:
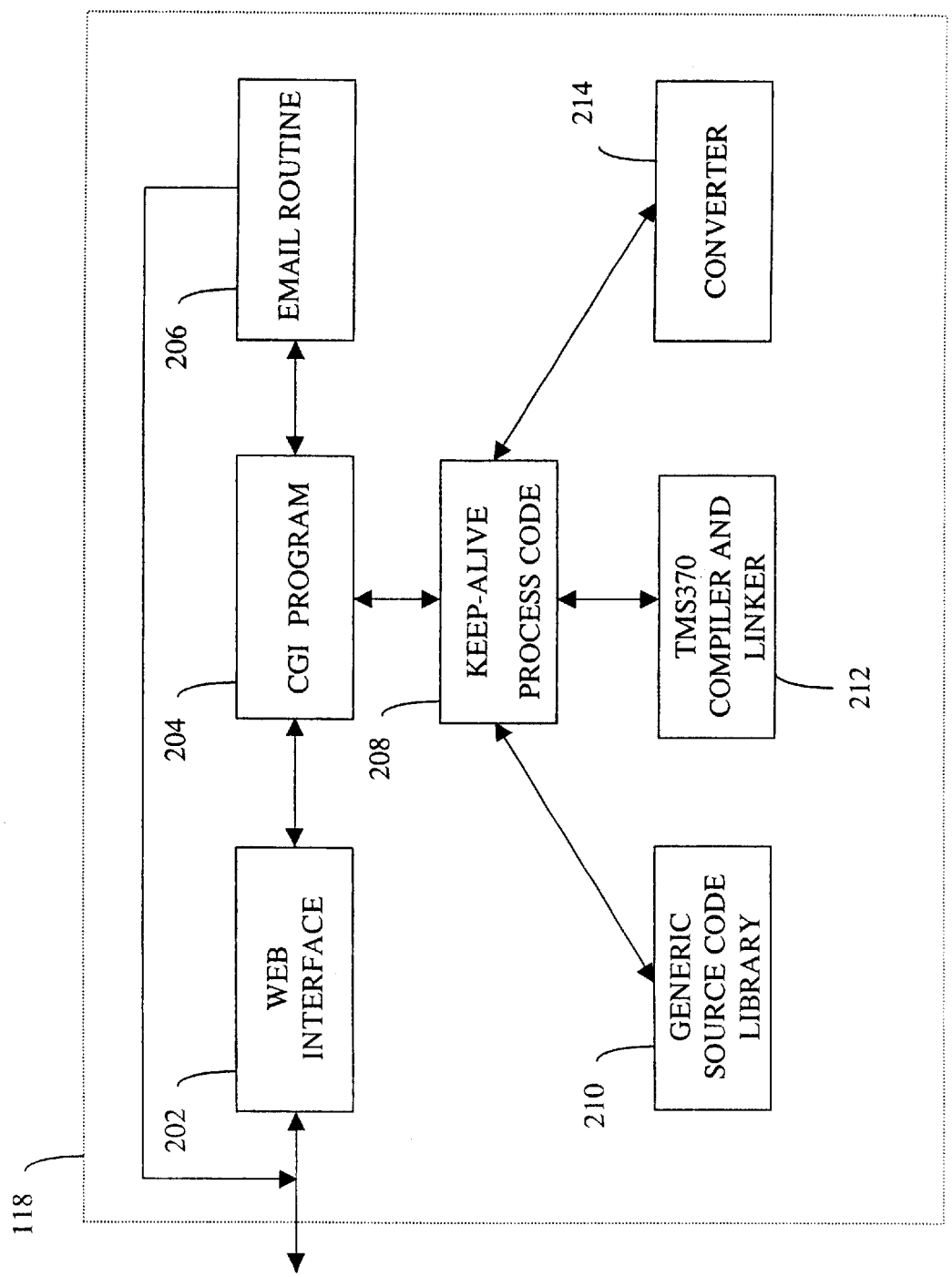
FIG. 2 is a block diagram of a software process implemented on a web server, according to an embodiment of the present invention.

FIG. 2 is a block diagram of an exemplary software process implemented on web server 118, according to an embodiment of the present invention. In this embodiment, a user communicates with web server 118 through a web interface 202. Web interface 202 provides user input to a CGI program 204. One of skill in the art will appreciate that CGI program 204 could be replaced with a web-based application that interfaces with an Internet server application program interface (ISAPI) or a Netscape server application programmer interface (NSAPI), as is appropriate. As previously discussed, CGI program 204 creates a specification file, which is passed to keep-alive process code 208. Alternatively, CGI program 204 could store the user provided input within memory and provide a pointer so that code 208 could access the information. Keep-alive process code 208 selects source code from a generic source code library 210 based upon the information (e.g., specification file). Upon selecting the source code from library 210, keep-alive process code 208 causes messages, provided by the customer, to be inserted into the selected code.

Under the direction of the keep-alive process code 208, a TMS370 compiler and linker 212 compiles and links the selected code as modified. TMS370 compiler and linker 212 provides an executable in an OUT format. In a preferred embodiment, a converter 214 (under the direction of the keep-alive process code 208) converts the executable from the OUT format to a PTP format. The PTP format is a Motorola executable format. One skilled in the art will appreciate that executables can be created for various hardware platforms and that the format provided to the customer can also be changed. Keep-alive process code 208 then provides the executable to CGI program 204. CGI program 204, which previously created the documentation (e.g., the specification file) for the executable, provides both the executable and the documentation via an e-mail routine 206 to the customer (via Internet 100). The documentation can be attached to the e-mail or incorporated into the e-mail message. One of skill in the art will appreciate that e-mail routine 206 can be incorporated within CGI program 204. One of skill in the art will also appreciate that instead of supplying an executable to a customer the web server could provide source code to the customer.

Figure 3:
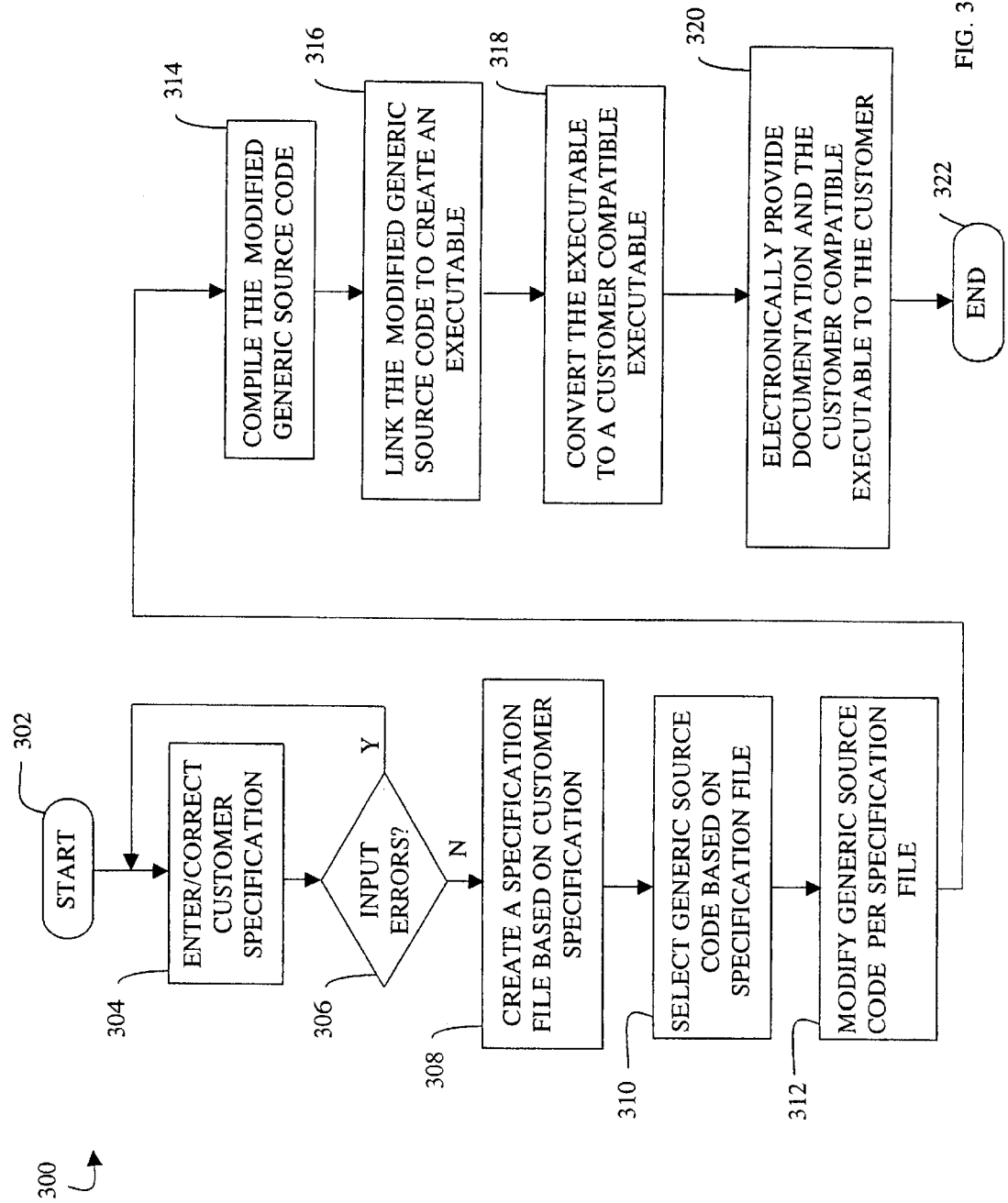
FIG. 3 is a flow diagram of the software process implemented on a web server, according to an embodiment of the present invention.

FIG. 3 is a flow chart of a keep-alive software creation and documentation process 300, according to an embodiment of the present invention. In step 302, process 300 is initiated. From step 302, control transfers to step 304. In step 304, a customer initially enters or corrects a customer specification through the web interface. The web interface provides a form (web page) in which the customer enters their requirements for a keep-alive. From step 304, control transfers to step 306. In step 306, process 300 determines whether certain common input errors have occurred. If so, control transfers from step 306 to step 304 (where a customer is prompted to correct the input errors). If not, control transfers from step 306 to step 308. In step 308, a CGI program creates a specification file based on the customer specification. As previously discussed, that specification is entered into a form provided by the web server. From step 308, control then transfers to step 310.

In step 310, a keep-alive process code selects source code from a generic source code library (based on the specification file). From step 310, control transfers to step 312. In step 312, under the direction of the keep-alive process code, the generic source code is modified (that is the keep-alive process code causes the commands provided by the customer to be inserted within the selected source code). From step 312, control transfers to step 314. In step 314, under the control of the keep-alive process code, the modified source code is compiled. From step 314, control transfers to step 316. In step 316, under the direction of the keep-alive process code, the compiled modified source code is linked to create an executable. From step 316, control transfers to step 318. In step 318, the executable is converted to a customer compatible executable. From step 318, control transfers to step 320. In step 320, the documentation and customer compatible executable are electronically provided to the customer, via e-mail. From step 320, control transfers to step 322. In step 322, process 300 ends.

In summary, a web interface is utilized to allow a customer to enter the specification for the software. Once the submit button is asserted, a web browser checks for several typical errors in the input. Preferably, the input errors are checked using a JavaScript preprocessor. If no errors are detected, the information is utilized by a CGI program to create a specification file. A keep-alive process code then selects source code from a library, based on the specification file. The keep-alive process code then causes the selected source code to be modified. The modified source code is then compiled, linked and converted (if necessary) to a customer compatible format. When this process is complete, the CGI program takes control and causes both the software and the specification file to be e-mailed to the customer. The specification file is used for documentation purposes and can be used to recreate the software it describes. The previously described technique advantageously provides both machine readable and human readable documentation, without intervention on the part of the supplier. In the disclosed embodiments, the software is a keep-alive. As discussed above, a keep-alive is a piece of software used at an automotive electronic production testing site to keep an electronic device awake. As previously mentioned, the electronic device can be a radio, an amplifier, a communication port, an OnStar® receiver or any number of electronic devices utilized in an automotive-type environment.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method for electronically providing customized software to a customer, comprising the steps of:
   receiving a customer specification through a web interface;
   automatically creating customer compatible software that meets the customer specification; and
   electronically providing the customer compatible software to the customer, wherein the customer compatible software is a customer compatible executable that is compiled from pre-existing source code that is modified to include customer specific messages provided by the customer in the customer specification.

2. The method of claim 1, wherein the receiving the customer specification step further includes the steps of:
   checking the customer specification for input errors; and
   prompting the customer to correct any detected errors before proceeding.

3. The method of claim 2, wherein the customer specification is checked for input errors by a JavaScript preprocessor.

4. The method of claim 1, wherein the creating software that meets the customer specification step further includes the steps of:
   creating a specification file based on the received customer specification using a common gateway interface (CGI) program; and
   creating the customer compatible executable based upon the specification file.

5. The method of claim 4, wherein the creating the customer compatible executable step further includes the steps of:
   selecting generic source code based on the specification file;
   modifying the generic source code based on the specification file;
   compiling the modified generic source code;
   linking the compiled modified generic source code to create an intermediate executable; and
   converting the intermediate executable to the customer compatible executable.

6. The method of claim 4, wherein the CGI program is written in Perl.

7. The method of claim 1, further including the step of:
   electronically providing documentation for the customer compatible software to the customer, wherein a supplier can recreate the customer compatible software from the documentation.

8. The method of claim 1, wherein the customer provides the customer specification by accessing a supplier web page and completing a form provided through the web interface.

9. The method of claim 1, wherein the customer compatible software is a keep-alive.

10. A web-based software delivery system for electronically providing customized software to a customer, comprising:
    a web server; and
    software design code located on the web server for performing the steps of:
       receiving a customer specification through a web interface;
       creating customer compatible software that meets the customer specification; and
       electronically providing the customer compatible software to the customer, wherein the customer compatible software is a customer compatible executable that is compiled from preexisting source code that is modified to include customer specific messages provided by the customer in the customer specification.

11. The web-based software delivery system of claim 10, wherein the receiving the customer specification step further includes the steps of:
    checking the customer specification for input errors; and
    prompting the customer to correct any detected errors before proceeding.

12. The web-based software delivery system of claim 11, wherein the customer specification is checked for input errors by a JavaScript preprocessor.

13. The web-based software delivery system of claim 10, wherein the creating software that meets the customer specification step further includes the steps of:
    creating a specification file based on the received customer specification using a common gateway interface (CGI) program; and
    creating the customer compatible executable based upon the specification file.

14. The web-based software delivery system of claim 13, wherein the creating the customer compatible executable step further includes the steps of:
    selecting generic source code based on the specification file;
    modifying the generic source code based on the specification file;
    compiling the modified generic source code;
    linking the modified generic source code to create an intermediate executable; and converting the intermediate executable to the customer compatible executable.

15. The web-based software delivery system of claim 13, wherein the CGI program is written in Perl.

16. The web-based software delivery system of claim 10, the software design code performing the additional step of:
   electronically providing documentation for the customer compatible software to the customer, wherein a supplier can recreate the customer compatible software from the documentation.

17. The web-based software delivery system of claim 10, wherein the customer provides the customer specification by accessing a supplier web page and completing a form provided through the web interface.

18. The web-based software delivery system of claim 10, wherein the customer compatible software is a keep-alive.

19. A web-based software delivery system for electronically providing customized keep-alive software to an automotive electronic production testing site customer, comprising:
   a web server; and
   software design code located on the web server for performing the steps of:
      receiving a customer specification through a web interface;
      creating customer compatible keep-alive software that meets the customer specification; and
      electronically providing the customer compatible keep-alive software to the customer, wherein the customer compatible keep-alive software is a customer compatible executable that is compiled from preexisting source code that is modified to include customer specific messages provided by the customer in the customer specification.

20. The web-based software delivery system of claim 19, wherein the receiving the customer specification step further includes the steps of:
   checking the customer specification for input errors; and
   prompting the customer to correct any detected errors before proceeding.

* * * * *